United States Patent
Cordy

[11] Patent Number: 6,129,996
[45] Date of Patent: Oct. 10, 2000

[54] CONVERSION COATINGS OF TIN WITH COBALT AND BISMUTH FOR ALUMINUM SLIDING SURFACES

[75] Inventor: Carl Edward Cordy, Greenfield, Ind.

[73] Assignee: Ford Motor Company, Dearborn, Mich.

[21] Appl. No.: 09/375,251

[22] Filed: Aug. 16, 1999

[51] Int. Cl.[7] .............................. B32B 15/01; C23C 22/00
[52] U.S. Cl. .................... 428/646; 148/243; 148/273; 148/275; 148/285; 428/650; 428/652; 428/628; 428/629; 428/469; 428/908.8; 428/926; 428/936
[58] Field of Search ...................... 428/646, 650, 428/652, 628, 629, 469, 908.8, 926, 936; 148/243, 273, 275, 285; 420/562

[56] References Cited

U.S. PATENT DOCUMENTS 4,252,618  2/1981  Grenda .
5,056,417  10/1991 Kato et al. .
5,655,432  8/1997  Wilkosz et al. .
5,864,745  1/1999  Kawagoe et al. .
5,911,809  6/1999  Cordy .

*Primary Examiner*—Deborah Jones
*Assistant Examiner*—Robert R. Koehler
*Attorney, Agent, or Firm*—Leslie C. Hodges

[57] ABSTRACT

An aluminum or aluminum alloy surface which during use is exposed to sliding friction has a chemical conversion coating of mostly tin with 0.2–10.0 wt. % cobalt and 0.1 to 12 wt. % bismuth. For example, a swashplate of a swashplate type compressor may be conversion coated on at least part thereof, that is the part that during use contact the shoes. Preferably, the coating is between 0.8 to 2.5 microns thick. The coating on the swash plate permits the use of low silicon alloy aluminum without the need of metal plating or high finish polishing.

24 Claims, 1 Drawing Sheet

CONVERSION COATINGS OF TIN WITH COBALT AND BISMUTH FOR ALUMINUM SLIDING SURFACES

Reference is made to related U.S. Pat. No. 5,911,809 and U.S. patent application Ser. No. 09/050,215 filed Mar. 30, 1998 entitled "Cobalt—Tin Alloy Coating on Aluminum by Chemical Conversion" commonly owned herewith.

FIELD OF THE INVENTION

The present invention relates to a cobalto—bismutho—tin coating provided on aluminum or aluminum alloy by chemical conversion to reduce the sliding friction of the surface and reduce wear of contacted components. The coating may be applied to surfaces such on swashplate surfaces of swashplate type compressors or other aluminum surfaces, such as pistons.

BACKGROUND OF THE INVENTION

Conventionally, a swash plate type compressor is used in systems such as an air conditioning system of an automobile. According to a known swash plate type compressor, the transmission of motive power is carried out, as a swash plate and a piston reciprocate, thereby suctioning, compressing and discharging the gas. The swash plate is usually composed of aluminum or aluminum alloy and makes slideable contact when it rotates with shoes which are composed of iron or light weight ceramics such as alumina. The metal on metal contact at the shoe and swash plate interface can be subject to undue wear and possible seizure of the shoe with the swash plate.

Treatments have been developed to improve the lubricity at the shoe/swash plate interface and lessen the swashplate surface wear. Conventionally swashplates are tin coated to improve lubricity. However, tin is relatively soft and while enhancing lubricity, has less than optimal hardness and durability. To improve the hardness, U.S. Pat. No. 5,056,417, for example, treats the swashplate body with a surface coating layer made of tin and at least one metal selected from the group consisting of copper, nickel, zinc, lead and indium. While any of these five materials are alloyed with tin to improve its wear resistance, none of them are described as also acting to bind the coating to the swashplate. U.S. Pat. No. 5,655,432 treated the swash plate with a cross-linked polyfluoro elastomer bonded directly to the aluminum, a lubricious additive and a load bearing additive. The coating process described adds to manufacturing complexity, and makes it more difficult to hold manufacturing tolerances than with a conventional tin conversion coating. In U.S. Pat. No. 5,864,745, a copper based flame-sprayed material which includes an unmelted structure of an atomized copper alloy powder is disclosed for coating swashplates. The coating may include one or more of lead, tin, phosphorus, aluminum, silver, silicon, manganese, chromium, nickel, and zinc not to exceed 50% of the coating. One drawback of flame sprayed coatings is that often the surface finish produced is too rough, so that post-coating machining is required. U.S. Pat. No. 4,252,618 discloses a electroplating process for tin wherein the bath contains tin ions, an alkali metal hydroxide, and bismuth citrate. This bath is taught to inhibit tin "disease" through the use of the citrate. Electroplating is known to add to the dimension of the electroplated part by the coating thickness, and electroplating requires the use of electric current which adds to the complexity of the coating process.

The present invention discloses a tin—cobalt—bismuth coating formed using conversion coating techniques which overcomes the deficiencies of prior art coatings. It provides a conversion coating which exhibits improved wear resistance and also excellent adhesion to aluminum or aluminum alloy surfaces which experience during use, sliding friction, e.g., surfaces of swashplates, pistons, etc. The coating also retains the high-lubricity of tin on the aluminum swashplate. The metals of the coating diffuse into the aluminum with no net part dimension growth observed.

SUMMARY OF THE INVENTION

The invention is an article having an aluminum or aluminum alloy surface which during use of the article is exposed to sliding friction. It carries a conversion coating on a least a portion of the surface, the coating is tin with 0.2 to 10 wt. % cobalt and 0.1 to 12 wt. % bismuth. The coating is formed by chemical conversion when the surface is contacted with an aqueous alkaline chemical conversion bath for aluminum, the bath containing soluble tin, cobalt, and bismuth compounds in amounts sufficient to provide said conversion coating. Examples of such article include swashplates and pistons.

A swash plate compressor has a cylinder block that has a cylinder bore disposed parallel to the axis of said cylinder block. A rotary shaft rotatably mounted within said cylinder block and a piston reciprocally fitted in the cylinder bore. The shoes slideably intervene between the piston and the swash plate. The swash plate comprises a matrix composed of aluminum or aluminum alloy and on at least a part of the swash plate surface the tin conversion coating layer disclosed above. The coated part of the surface of the swash plate is that which in slideable contact with the shoes during compressor operation.

Advantageously, the added cobalt provides improved adhesion over a conventional tin conversion coating. In addition, bismuth was unexpectedly found to smoothen out the tin alloy coating surface believed to take place by regulation of the tin conversion coating deposition reaction. And the bismuth was unexpectedly found to also enhance tin lubricity. Both the cobalt and the bismuth thus contribute to improvement of the wear resistance of the aluminum surface.

DETAILED DESCRIPTION OF THE PREFERRED EMBODIMENTS

The invention relates to providing conversion coatings on aluminum or aluminum alloy, which may comprise an entire article or only a surface of the article, as when the article is steel or some other metal with a surface of aluminum provided thereon. The article or substrate may be, for example, a swashplate of an automotive compressor, or pistons, any article whose aluminum surface would benefit from increased lubricity and decreased wear provided by an adherent coating. These may also include connecting rods for piston engines or crankshaft based refrigeration/AC compressors. The article may also be a non-automotive article. As is well known in the art, in the conversion coating process a substrate is reacted with other materials (e.g., which may be a solids, liquids or gas) so that its surface is chemically converted into different compounds which have different properties. Further the process usually takes place at an elevated temperature where diffusion is often an essential aspect of the conversion. The conversion coating process and resultant coating is thus significantly different from coating processes like electrolytic deposition which is primarily concerned with deposition of ions, e.g., positive ions being deposited onto the cathode (negative electrode). As is known in the art, in the conversion coating process of aluminum, the surface aluminum, by means of alkalinity in the coating bath, solubilizes as an aluminate into the bath. Later, in the present invention it combines with the conversion coating materials, including cobalt, bismuth and tin, to redeposit on the aluminum surface as a complex including tin, cobalt, and bismuth which is tightly chemically bonded and diffused into the aluminum surface. This is in contrast, for example, where a material is spray coated as by thermal spray or plated onto the surface of a metal. Often with a conventional plating or coating process, an interlayer is applied between an aluminum substrate and the outer lubricious layer to bond the two together. The present invention conversion coating process invention thus avoids the manufacturing complexity associated with providing this interlayer-outer layer system. And while thermal sprayed or electroplated coating increase the dimension of the part by the thickness of the coating, the present invention conversion coating was found to not increase the part dimension.

The swashplate is an example of aluminum or aluminum alloy surfaces which may be conversion coated according to the present invention and will hereafter be described in detail merely for exemplary purposes. As discussed above, however, other articles having an aluminum or aluminum alloy surface, especially like those materials described, may optimally be conversion coated according to the present invention.

Figure 1:
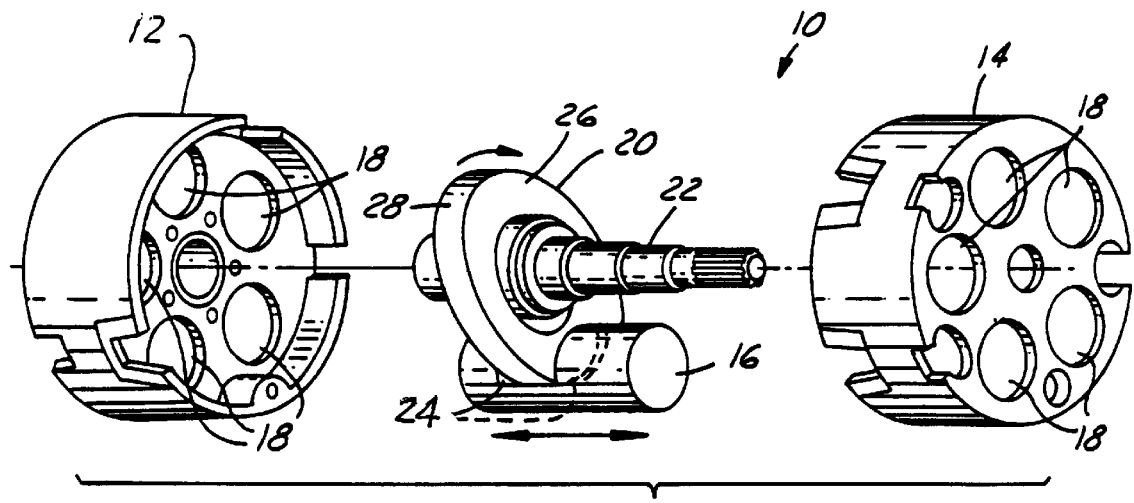
FIG. 1 is an exploded view of a swash plate compressor according to an embodiment of the present invention.

Illustrated in FIG. 1 is a perspective and exploded view of an automotive swash plate type compressor 10 for propelling refrigerant gas through a cooling circuit. The compressor 10 comprises a two-piece cylinder block 12, 14 which is provided with a plurality of reciprocating pistons 16. For clarity, FIG. 1 depicts only one of such reciprocating piston 16. In practice, each piston 16 reciprocates within one of the cylinder bores 18.

Each piston 16 is in communication with the swash plate 20 which is fixably mounted on an axially extending rotateable shaft 22. The reciprocating motion of each piston 16 within its associated cylinder bore successively siphons, compresses, and discharges refrigerant gas. A pair of pivoting shoes 24 are positioned between each piston 16 and swash plate 20. The shoe 24 transfers the rotational motion of the swash plate 20 to the linear motion of the piston 16. The swash plate 20 has two facial surfaces 26 (only one shown for clarity) which contact the shoe 24.

Rotation of the shaft 22 causes the swash plate 20 to rotate between the cylinder blocks 12, and 14. The facial surfaces 26 contact the shoes 24 and are subjected to a shear-type frictional contact with shoe 24. An end surface 28 may contact the piston 16 if the piston 16 is slightly skewed or bent. End surface 28 and the facial surfaces 26 are coated to prevent wear from the contact with piston 16 and shoes 24. The surface coating 30 should also have a low coefficient of friction to increase the efficiency of the compressor.

The shape of swash plate 20 according to the present invention may be the same as those of the conventional swash plates. The material composing the matrix of swash plate body 20 should be aluminum or aluminum alloy. The aluminum alloy can be, for example, aluminum—high-silicon type alloy, aluminum—silicon magnesium type alloy, aluminum—silicon—copper—magnesium type alloy and, aluminum alloys containing no silicon.

Figure 2:
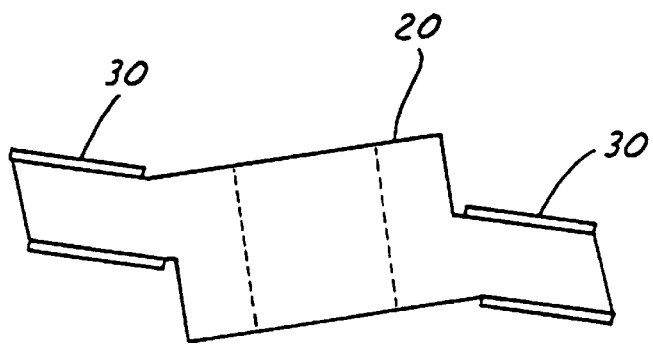
FIG. 2 is a cross-sectional view of the swashplate with a coating later thereon.

Swash plate 20 is usually made from an aluminum or aluminum alloy material to make it light-weight and strong. Aluminum and aluminum alloys containing hypereutectic silicon, that is more silicon than is required to form a eutectic crystalline structure, are often used. While the surface coating 30 (shown in FIG. 2) of the present invention may be used with hypereutectic aluminum, it is primarily intended for use on non-hypereutectic aluminum and aluminum alloys having less than 12.5% by weight of silicon. Hard grains, as used herein means grains having average particle diameters of 20 through 100 micrometer and a hardness greater than 300 on the Vickers hardness scale or, more preferably, having a hardness greater than 600 on the Vickers hardness scale, such as a primary crystal silicon. For example, aluminum—high-silicon type alloy can be considered as one of materials suitable materials for swash plate body 20. Because alsil alloy contains about 13% to 30% by weight of silicon meaning that alsil alloy contains more silicon than is required to form a eutectic crystal structure, alsil alloy has primary crystal silicon dispersed in the matrix structure. Also alsil has superior characteristics and could withstand very severe sliding operations at the swash plate. Other materials having the hard grains and possibly applicable to swash plate body 20 are the intermetallic compounds of: aluminum—manganese; aluminum—silicon—manganese; aluminum—iron—manganese; aluminum—chromium and the like. The weight of silicon in the aluminum could also comprise 13% or less by weight of silicone.

Conventionally, swashplate body 20 is made of aluminum or aluminum alloy directly contacts shoes 24. However, according to the present invention, during operation with surface coating layer 30, on swash plate body 20 contacts shoes 24 so that the frictional resistance with the shoes is greatly reduced. While it is only necessary to coat facial surface 26 having contact with shoes 24, for ease of manufacture the entire swash plate body 20 is coated.

According to the present invention, the swash plate body 20 has a surface coating layer 30. The surface coating layer 30 is formed on the surface of swash plate body 20 at least on the part of the surface having sliceable contact with shoes 24. The surface coating layer 30 may, however, be formed over the whole surface of the swash plate body 20. The surface coating layer 30 acts to reduce frictional resistance with shoes 24 and prevents the occurrence of seizure at the sliding facial surface 26 of the swash plate 20.

The present invention surface conversion coating layer 30 is composed primarily of tin, modified with cobalt. If surface coating layer 30 is composed only of tin the coefficient of friction will be lowered but at the same time, the surface coating layer becomes rather soft due to the characteristics of tin and, as a result, surface coating layer 30 will be susceptive to abrasion. In particular, based on the total weight of the tin, cobalt and bismuth of surface coating 30, it comprises 0.2–10 wt. % cobalt, more preferably 0.2–2.1 wt. % cobalt, 0.1 to 12 wt. % bismuth, more preferably being 0.2 to 5 wt. % bismuth, and the balance being tin, most preferably being 92.9 to 99.7 wt. % tin, 0.2 to 2.1 wt. % cobalt and 0.2 to 5 wt. % bismuth. Preferably, the coating's cobalt to bismuth content ratio, based on weight, is between 3:8 and 5:2. Most preferably, the cobalt to bismuth content ratio is between 4:5 and 3:2.

It is found by the inventor of the present invention that the coexistence of tin, cobalt and bismuth in the matrix structure of surface coating layer 30 provides a low coefficient of friction as well as improved hardness, so that high abrasion resistance is obtained. In addition, the adhesion of the coating to the swashplate 20 is improved by the addition of cobalt and bismuth.

Surface coating 30 is applied to the swash plate 20 by means of a convention conversion coating process. It is known in the art that conversion coating formation involves chemical reaction of the metal of the surface with components of the conversion coating bath. In the present invention, the pH of the bath is basic or alkaline, that is, the pH is greater than 7 and the aluminum is oxidized and the tin reduced in the process of forming the coating.

An aqueous tin bath is prepared according to convention usually from an alkali metal stannate and then a soluble cobalt compound, e.g., a chloride and a soluble bismuth compound, e.g. a citrate, acetate, or nitrate are dissolved in the bath and the alkaline aqueous solution is heated to a temperature above 120° F. Other soluble salts of these baths metal are also useable. The concentration of cobalt and bismuth in the bath is that necessary to provide a coating on the swash plate of 0.2–10 wt. cobalt and 0.1 to 12 wt. % bismuth, with the balance being tin. Preferably the bath is in between 120° F. and 150° F. To provide that amount of cobalt/tin on swash plate 20, the bath, in one preferred embodiment, comprises 0.0063 to 0.63 wt. % cobalt chloride, 0.0038 to 0.077 wt % bismuth citrate and 6–7.2 wt. % potassium stannate. More preferably, maintaining the same amount of potassium stannate, 0.017–0.32 wt. % cobalt chloride with 0.0058–0.058 wt % bismuth citrate and most preferably 0.021–0.21 wt. % cobalt chloride with 0.0096–0.029 wt % bismuth citrate. Additionally the bath comprises conventional materials used in such baths like chelates and pH buffers. Increasing the amount of cobalt in the conversion coating increases its durability and adhesion to the aluminum substrate. Preferably the source of the cobalt ion is cobalt chloride, compounds such as cobalt nitrate do not demonstrate the same results. Preferably the source of the bismuth ion is a citrate or acetate thereof.

Before applying surface coating 30, the swash plate 20 is exposed to a cleaning solution which removes surface oils and prepares the part for the coating application. Cleaning methods typically include solvent, acid or alkaline washings. The parts are then optimally exposed to the solution for 5–6 minutes to conversion coat to an optimal thickness. The time to deposit a desired thickness of a coating is influenced by the concentration of the components, the bath temperature and catalysts as is known to those skilled in the art. Selection of other conditions would be within the skill of one in the art in view of the present disclosure.

The thickness of the surface coating 30 is preferably from 0.8 to 2.5 microns. Applicants found that if the surface coating layer 30 has a thickness of less than 0.8 microns, the coefficient of friction will not be sufficiently lowered. On the other hand, if the surface coating layer 30 has a thickness of more than 2.5 micrometers, the surface coating layer 30 will be susceptive to problems concerning its strength such as to resist peeling-off during extended use.

According to the present invention, the coefficient of friction between swash plate 20 and shoe 24 is small so that the smooth sliding of shoe 24 on the swash plate 20 is ensured. The surface coating layer 30 is superior in strength thereby reducing the amount of abrasion which occurs thereon. Still further, seizure of the shoe 24 to the surface of swash plate 20 is prevented even when a liquid refrigerant is compressed or the compressor is operated under unfavorable circumstances such as insufficient lubrication of the sliding parts caused by leaks of refrigerant gas to the outside of the compressor. Consequently, by the effects described above, the swash plate compressor according to the present invention can satisfactory withstand very severe use and achieve long service life.

EXAMPLE 1

This is a comparative example not according to the present invention in which a swash plate body was coated with a Sn coating composition not containing either cobalt or bismuth as follows:

According to the swash plate type compressor as shown in FIG. 1, the swash plate 20 is composed of a swash plate body 20 made of an aluminum alloy containing 10–12.5% by weight of silicon, and the surface coating layer 30 formed on the whole surface of the swash plate body 20. The surface coating layer 30 was formed by the following process:

The swash plate 20 was cleaned with alkaline cleaner at 140° F. for 5 minutes. The swash plate body 20 is immersed for 5 minutes into a aqueous bath solution which contains 6.6 wt. % potassium stannate and which was kept at 130°–147° F. It was then taken out from the Sn bath and water washed. As a result, a surface coating layer 30 having a thickness of 1.0 micrometers was composed of 100 wt. % tin was formed over the whole surface of the swash plate body 20. The resultant surface coating layer 30 had a thickness of 1.0 micrometers. The coating process was repeated on five different swashplate samples.

EXAMPLE 2

This is a comparative example where the conversion coating comprises only cobalt and tin, without the bismuth required in the present invention coating.

As in Example 1, a swash plate was coated by chemical conversion according to the described steps except that the coating bath contains 6.6 wt. % potassium stannate and 0.020 wt. % cobalt chloride (0.005 wt. % Co) and which was kept at 130°–147° F. As a result, a surface coating layer 30 consisting of tin and cobalt was formed over the whole surface of the swash plate body 20. The resultant surface coating layer 30 composed of 0.36 wt. % cobalt and the balance being tin had a thickness of 1.0 micrometers. This coating procedure was repeated on five additional swashplate samples.

EXAMPLE 3

This is a comparative example, not according to the present invention. The conversion coating comprises only tin and cobalt, without bismuth as required in the present invention coating.

A swash plate as in the prior examples is coated after cleaning as above using a aqueous bath solution which contains 6.6 wt. % potassium stannate and 0.028 wt. % cobalt chloride (0.007 wt. % Co) by weight. Thus this example has more cobalt than that of Example 2. It was then taken out from the Sn/Co bath and water washed. As a result, a surface coating layer 30 consisting of tin and cobalt was formed over the whole surface of the swash plate body 20. The resultant surface coating layer 30 composed of 99.5 wt. % tin and 0.5 wt. % cobalt by weight had a thickness of 1.0 micrometers. The procedure was repeated on 9 additional swashplate samples.

EXAMPLE 4

This is a comparative example, not according to the present invention. The conversion coating comprises only tin and cobalt, without bismuth as required in the present invention coating.

A swash plate as in the prior examples is coated after cleaning in alkaline cleaner using a aqueous bath solution which contains 6.6 wt. % potassium stannate and 0.052 wt. % cobalt chloride (0.013 wt. % Co) by weight. Thus this example has more cobalt than that of Example 3. It was then taken out from the Sn/Co bath and water washed. As a result, a surface coating layer 30 consisting of tin and cobalt was formed over the whole surface of the swash plate body 20. The resultant surface coating layer 30 composed of 99.1 wt. % tin and 0.9 wt. % cobalt by weight had a thickness of 1.5 micrometers. The procedure of this example was repeated on 5 additional swashplate samples.

EXAMPLE 5

This is a conversion coating comprising tin, cobalt, and bismuth formed according to an embodiment of the present invention. It was formed along the lines of those in the above examples.

The swash plate 20 was cleaned with alkaline cleaner for 5 minutes. The swash plate body 20 is immersed for 5 minutes into a aqueous bath solution which contains 6.6 wt. % potassium stannate, 0.020 wt. % cobalt chloride, and 0.01 wt. % bismuth citrate by weight, and which was kept at 130°–147° F. The swashplate was then taken out from the Sn/Co/Bi bath and water washed. As a result, a surface coating layer 30 consisting of tin, cobalt, and bismuth was formed over the whole surface of the swash plate body 20. The resultant surface coating layer 30 composed of 0.3 wt. % cobalt, 0.4 wt. % bismuth, and the balance being tin had a thickness of 1.3 micrometers. The example procedure was repeated on 3 additional swashplate samples.

EXAMPLE 6

This is a conversion coating comprising tin, cobalt, and bismuth formed according to an embodiment of the present invention. It was formed along the lines of those in the above examples.

The swash plate 20 was cleaned with alkaline cleaner for 5 minutes. The swash plate body 20 is immersed for 5 minutes into a aqueous bath solution which contains 6.6 wt. % potassium stannate, 0.052 wt. % cobalt chloride, and 0.019 wt. % bismuth nitrate by weight, and which was kept at 130°–147° F. The bismuth nitrate formed a milky white solution when added to the de-ionized water used as a solvent. When added to the tin solution, the cloudiness slowly disappeared. This indicates that while bismuth nitrate can provide a bismuth source for the present invention, the uptake into the tin solution is rather slow. Thus, a bismuth compound that more quickly dissolves is the preferred source. The swashplate was then taken out from the Sn/Co/Bi bath and water washed. As a result, a surface coating layer 30 consisting of tin, cobalt, and bismuth was formed over the whole surface of the swash plate body 20. The resultant surface coating layer 30 composed of 0.9 wt. % cobalt, 1.0 wt. % bismuth, and the balance being tin had a thickness of 1.5 micrometers. The procedure of this example was repeated on three additional swashplate samples.

To test the wear and adhesion of the above example coatings, 36 samples in total for the six examples, they were subjected to calorimeter testing. The calorimeter test measures accelerated wear and loss of adhesion of a typical tin based coating. Test samples are subject to the same conditions and then the wear of the coating is compared. The assembled compressor is subjected to both high and low speed usage. A test compressor pump was run for 1 hour at simulated low speed usage, and 1 hour at simulated high speed usage. At such low and high speeds the compressor is subjected to 1000 and 3000 RPMs respectively. The data comparing the adhesion of the coatings prepared above in Examples 1–6 is compiled in Table 1 below, in that order. The wear of both facial surfaces 26 of the swash plate body 20 was compared.

TABLE 1

Examples 1–6

| | Wt. % Co in solution | Wt. % Bi in solution | Loss of Adhesion Front Surface (mm) | Loss of Adhesion Rear Surface (mm) |
|---|---|---|---|---|
| Example 1 Samples | 0 (0 in coat) | 0 (0 in coat) | 150<br>56.8<br>4.15<br>20.46<br>40.2 | 10.4<br>23.76<br>39.93<br>43.8<br>194.94 |
| Example 2 Samples | 0.005 (0.36 in coat) | 0 (0 in coat) | 0<br>0<br>38<br>0<br>0<br>170.4 | 0<br>0<br>0<br>0<br>6.3<br>0 |
| Example 3 Samples | 0.007 (0.5 in coat) | 0 (0 in coat) | 0<br>0<br>18<br>16.8<br>0<br>0<br>36<br>0<br>0<br>0 | 0<br>0<br>0<br>0<br>70<br>0<br>0<br>0<br>0<br>0 |
| Example 4 Samples | 0.013 (0.93 in coat) | 0 (0 in coat) | 3<br>8<br>4<br>0<br>0<br>17.5 | 0.8<br>0<br>0<br>0<br>1.8<br>0 |
| Example 5 Samples | 0.004 (0.3 in coat) | 0.005 (0.4 in coat) | 0<br>0<br>3<br>0 | 0.9<br>0<br>0<br>0 |
| Example 6 Samples | 0.013 (0.93 in coat) | 0.01 (1.0 in coat) | 2<br>0<br>0<br>0 | 0<br>0<br>0<br>0 |

In the table, the weight % Co and Bi in the coating are listed in parentheses under the bath concentration of these components.

This table illustrate the advantage of including bismuth and cobalt with tin in forming conversion coatings on aluminum for improved wear properties. The test involved two hour calorimeter test administered to the six different coatings prepared above. That is, more specifically, the third column of Table 1 shows loss of coating adhesion area in square millimeters on front facial surface of swash plate with comparative coatings (examples 1–4) with present invention embodiment samples coatings (examples 5–6). Table 1, the fourth column, shows loss of coating adhesion data for the swash plate rear facial surface in same manner as for the front surface. As indicated in Table 1, the adhesion measured for swash plates 20 having the surface coating layer 30 in accordance with the Example 5 and 6 embodiments of the present invention was much higher than that for the conventional type coating described in comparative Examples 1–4.

From the table it can be seen that the addition of cobalt improves adhesion and wear of the coating as compared to pure tin. And, as seen from the table, including bismuth with the cobalt in the tin coating according to an embodiment of the present invention provides much superior adhesion and wear resistance. Thus the invention tin/cobalt/bismuth conversion coating provides excellent resistance to abrasion as compared to the other coatings.

As is apparent from the test results shown in the table, according to the present invention, the occurrence of loss of adhesion of the coating is greatly reduced due to the effect of the surface coating layer 30 although the swash plate type compressor is operated under severe conditions.

Further Experimental Results

A standard tape adhesion test was administered on the samples prepared in examples 1–6. The test measures the amount of coating that can be removed when placed under stress. 3M 610 cellophane tape was applied to the coated swashplates in 2–3 mm strips. The tape was rubbed with a rubber eraser to ensure the adhesion of the tape and then the tape was removed in one quick motion in which a 90 degree angle was kept between the tape and the surface of swash plate 20. The Example 1 all tin coating showed poorest adhesion. Adhesion improved correspondingly with increasing amounts of cobalt in the coatings when no bismuth was included, i.e., the cobalt/tin coating with 0.007 wt. % Co had improved adhesion over the 0.005 wt. % cobalt/tin coating. These tape adhesion results plateaued after 0.007% Co. That is, in only tin/cobalt samples, the 0.013% Co samples provided the same adhesion values as 0.007 wt. % Co.

Advantageously, adding bismuth with the cobalt in the tin conversion coating unexpectedly allowed the cobalt concentration to be reduced while still providing excellent adhesion. That is, the tape test results for the Sn/Co/Bi coating with 0.004 wt. % Co and 0.005% wt. % Bi were approximately the same as Sn/Co coatings having either 0.007% Co or 0.013% Co. As discussed above, it is believed by the inventor that adding in the bismuth has a significant effect on regulating the tin deposition reaction during the conversion coating formation. This results in a smoother tin alloy coating which improves the adhesion as shown in Example 6. Being able to reduce the amount of cobalt when adding bismuth while maintaining excellent adhesion is advantageous because of cobalt's importance as a strategic metal and its higher cost relative to bismuth.

EXAMPLE 7

To further demonstrate the enhanced adhesion properties provided by the addition of bismuth, a tin bath without the powerful chelate, EDTA which is also known to promote adhesion and which was included in the bath solutions for examples 1–6 was made. This test solution consisted of 6.6% potassium stannate, and other additives, such as potassium hydroxide and pH buffers.

Into one portion of the test solution, (a) 0.004 wt. % Co solution was added and the other portion (b) contained 0.004 wt. % Co and 0.01 wt. % Bi as additives. The baths were kept at 145 deg F. Sample swash plates were coated in each bath, and the standard tape adhesion test was performed. The swash plates from the (a) 0.004 wt. % Co solution had coating pull-off areas of 95%, 80%, 75%, and 55% respectively. The swashplates from the (b) 0.004 wt. % Co and 0.005 wt. % Bi had no coating pull-off for the two samples run. This shows that bismuth significantly improves the coating adhesion to the aluminum substrate.

EXAMPLE 8

To demonstrate bismuth's ability to regulate the tin reaction's speed and give a smoother coating, a stock tin solution of the same composition as examples 1–6 was produced. Into one portion, 0.013 wt % Co was added. The other contained 0.013 wt. % Co and 0.01 wt. % Bi. As in the conversion coating of the other examples, the coating reaction liberates hydrogen gas. The reaction time interval is defined by the beginning and end of vigorous out-gassing. The reaction was timed for both portions of this example. For the Co only solution, reaction times were 43, 42, and 45 seconds. For the Co—Bi solution, reaction times were 55 and 56 seconds. Upon inspection, the Co—Bi parts had a smoother, significantly brighter surface than the Co only. This brightness is a measure of the surface smoothness of the coating.

EXAMPLE 9

This is a comparative example not according to the present invention in which a swash plate was coated with a conversion coating comprising only of bismuth and tin, without the cobalt required in the present invention coating.

A swash plate was cleaned in alkaline cleaner for 5 minutes. The swash plate body 20 is immersed for 5 minutes into an aqueous bath solution consisting of 6.6% potassium stannate, made from the same commercially available concentrate that contains EDTA, as used in examples 1–6 and 8, and 0.01 wt % bismuth citrate (0.005% Bi in solution) by weight, which was kept at 130–147 deg F. During the coating operation, vigorous outgassing, more violent than any other example, was noted. The reaction outgassing stopped between 30 and 35 seconds, about 10 seconds shorter than cobalt and tin, and about 20 seconds shorter than cobalt, bismuth, and tin.

The swashplate was then taken out of the Sn/Bi bath and water washed. The sample had a standard tape adhesion test performed on it in the same manner as previous examples. A slight amount of tin was pulled off on the tape, approximately 1% coverage on the tape contact area.

A second swash plate was cleaned in the same manner as the first in this example. It was then immersed into an aqueous bath solution consisting of 6.6% potassium stannate as above and 0.02% bismuth citrate (0.01% Bi in solution) by weight, which was kept at 130–147 deg F. Again, the vigorous outgassing, more violent than other examples, was noted. This outgassing again stopped between 30 and 35 seconds, a more accurate reading was made difficult by the gas activity.

This second swashplate was taken out of the Sn/Bi bath and water washed. Again, a standard tape adhesion test was performed and slight tin pull-off (about 1%) was noted on the tape contact area.

Comparing these results to those in example 8 indicate that the combination of cobalt and bismuth has a synergistic effect on the tin—aluminum conversion reaction that is not produced by bismuth or cobalt alone. Furthermore, the cobalt, bismuth, and tin coating has improved adhesion properties over cobalt and tin coating or bismuth and tin coating, as shown by the tape test results of this example and those of Example 2: 0.005% Co in solution, Example 3: 0.007% Co in solution, and Example 5: 0.004% Co in solution, 0.005% Bi in solution.

EXAMPLE 10

To test the use of bismuth acetate as a source for bismuth, a bath was made with 6.6% potassium stannate, 0.013 wt. % cobalt, added as cobaltous chloride, and 0.010 wt. % bismuth, added as bismuth acetate. The procedure for coating was as in Example 6. Two swashplates were tested and passed tape adhesion with no pull off. Appearance and coating thickness were also the same as those coated with bismuth citrate as the source of bismuth.

Also, according to the present invention, even in the state where the surface coating layer 30 of the swash plate 20 is gradually reduced by abrasion, the primary crystal silicon dispersed on the surface of the swash plate body 20 was exposed and sticks on the swash plate surface 20. Since primary crystal silicon has a great hardness, the further abrasion of the surface coating layer 30 is prevented.

It will be obvious to those of skill in the art that various modifications variations may be made to the foregoing invention without departing from the spirit and scope of the claims that follow.

I claim:

1. An article having an aluminum or aluminum alloy surface which, during use of the article, is exposed to sliding friction and which carries, on at least a part thereof, a chemical conversion coating of tin with 0.2 to 10.0 wt. % cobalt and 0.1 to 12 wt. % bismuth, the coating being formed by contact with an aqueous alkaline conversion coating bath, the bath containing soluble tin, bismuth and cobalt compounds in amounts sufficient to provide said conversion coating on said aluminum surface.

2. The article of claim 1, wherein said aluminum alloy comprises 13% to 30% silicon by weight.

3. The article of claim 1, wherein said aluminum alloy comprises 13% or less by weight of silicon.

4. The article of claim 3, wherein said aluminum alloy comprises an aluminum—silicon alloy having about 10–12.5% by weight of silicon.

5. The article of claim 1, wherein the thickness of said surface coating layer is from 0.8 to 2.5 microns.

6. The article of claim 1, wherein the coating comprises 0.2–5 wt. % bismuth.

7. The article of claim 1, wherein the coating comprises 0.2–2.1 wt. % cobalt.

8. The article of claim 1, wherein the coating comprises 92.9–99.7 wt. % tin, 0.2–2.1 wt. % cobalt and 0.2–5 wt. % bismuth.

9. The article of claim 1, wherein said bath is maintained at a temperature of at 120–150° F.

10. The article of claim 1, wherein said article is a swashplate from a swashplate compressor or a piston.

11. The article according to claim 1, wherein said bath further contains chelates.

12. The article according to claim 1, wherein said cobalt in said bath is provided by cobalt chloride.

13. The article according to claim 1, wherein said tin is provided in said bath by alkali metal stannate.

14. The article according to claim 1, wherein said bismuth is provided in said bath by bismuth citrate.

15. A method of coating an article having a surface of aluminum or aluminum alloy by conversion coating techniques comprising the steps of:

exposing at least a portion of said aluminum or aluminum alloy surface to an alkaline aqueous conversion coating bath for aluminum at elevated temperatures, said bath comprising tin, cobalt, and bismuth, and forming on said surface a conversion coating comprising 0.2 to 10 wt. % cobalt, 0.1 to 12 wt. % bismuth, and the balance being tin.

16. The method according to claim 15, wherein said cobalt in said bath is provided by cobalt chloride and said bismuth is provided by bismuth citrate.

17. The method according to claim 15, wherein the temperature of the bath is 120–150° F.

18. The method according to claim 15, wherein said aluminum alloy comprises 13% to 30% silicon by weight.

19. The method according to claim 15, wherein said aluminum alloy comprises 13% or less by weight of silicon.

20. The method of claim 15, wherein the thickness of said surface coating layer is from 0.8 to 2.5 microns.

21. The method of claim 15, wherein the coating comprises 0.2–2.1 wt. % cobalt.

22. The method of claim 15, wherein the coating comprises 0.2–5 wt. % bismuth.

23. The article according to claim 1 wherein the coating has a weight ratio of cobalt to bismuth between 3:8 and 5:2.

24. The method of claim 15 wherein the coating has a weight ratio of cobalt to bismuth between 3:8 and 5:2.

* * * * *